United States Patent
Gawor et al.

(10) Patent No.: US 8,448,014 B2
(45) Date of Patent: May 21, 2013

(54) SELF-HEALING FAILOVER USING A REPOSITORY AND DEPENDENCY MANAGEMENT SYSTEM

(75) Inventors: Jaroslaw Gawor, Apex, NC (US); Lin Sun, Morrisville, NC (US); Paul Franklin McMahan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/766,123

(22) Filed: Apr. 23, 2010

(65) Prior Publication Data
US 2011/0264953 A1    Oct. 27, 2011

(51) Int. Cl.
*G06F 11/00* (2006.01)

(52) U.S. Cl.
USPC ............................ 714/4.11; 714/4.1; 714/4.12

(58) Field of Classification Search
USPC ....................................................... 714/4.11
See application file for complete search history.

(56) References Cited

U.S. PATENT DOCUMENTS

| | | | |
|---|---|---|---|
| 6,243,825 B1 * | 6/2001 | Gamache et al. | 714/4.4 |
| 6,871,345 B1 * | 3/2005 | Crow et al. | 717/175 |
| 7,010,593 B2 | 3/2006 | Raymond | |
| 7,840,730 B2 * | 11/2010 | D'Amato et al. | 710/74 |
| 8,122,089 B2 * | 2/2012 | Kay et al. | 709/206 |
| 2003/0009551 A1 | 1/2003 | Benfield et al. | |
| 2004/0153866 A1 * | 8/2004 | Guimbellot et al. | 714/47 |
| 2006/0047776 A1 * | 3/2006 | Chieng et al. | 709/217 |
| 2007/0038642 A1 | 2/2007 | Durgin et al. | 707/10 |
| 2007/0283344 A1 * | 12/2007 | Apte et al. | 717/174 |
| 2008/0016115 A1 * | 1/2008 | Bahl et al. | 707/104.1 |
| 2008/0244307 A1 * | 10/2008 | Dasari et al. | 714/4 |
| 2008/0307266 A1 * | 12/2008 | Chandrasekaran | 714/38 |
| 2008/0307267 A1 * | 12/2008 | Chandrasekaran | 714/38 |
| 2009/0106327 A1 | 4/2009 | Dilman et al. | |
| 2009/0187823 A1 * | 7/2009 | Farrell et al. | 715/700 |
| 2009/0327798 A1 * | 12/2009 | D'Amato et al. | 714/4 |
| 2010/0162030 A1 * | 6/2010 | Schindel et al. | 714/3 |
| 2010/0169860 A1 * | 7/2010 | Biazetti et al. | 717/107 |
| 2010/0235493 A1 * | 9/2010 | Besaw et al. | 709/224 |
| 2010/0241896 A1 * | 9/2010 | Brown et al. | 714/4 |
| 2011/0131295 A1 * | 6/2011 | Jolfaei | 709/219 |
| 2011/0214007 A1 * | 9/2011 | Sreenivasan et al. | 714/4.11 |

OTHER PUBLICATIONS

Florin Sultan; System Support for Service Availability, Remote Hearing and Fault Tolerance using Lazey State Propagation; 2004.

Aniruddha Bohra; System Architectures Based on Functionality Offloading; 2008.

* cited by examiner

*Primary Examiner* — Kamini Patel
(74) *Attorney, Agent, or Firm* — Grasso PLLC; Fred Grasso

(57) ABSTRACT

Systems, devices, methods, and articles of manufacture employing repair modules are provided. The modules may be automatically deployed in conjunction with dependency mechanisms upon identifying a malfunctioning application. The modules may be specifically tailored for certain diagnosis or repair and may be selected for deployment to a second application using information regarding the malfunction of a first application.

19 Claims, 5 Drawing Sheets

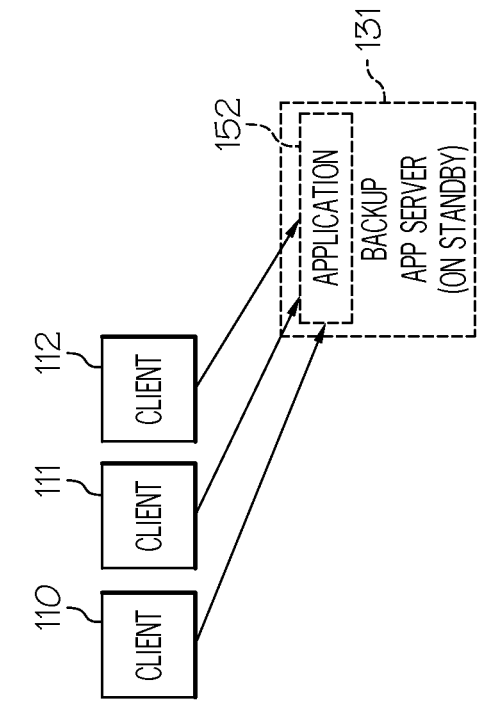
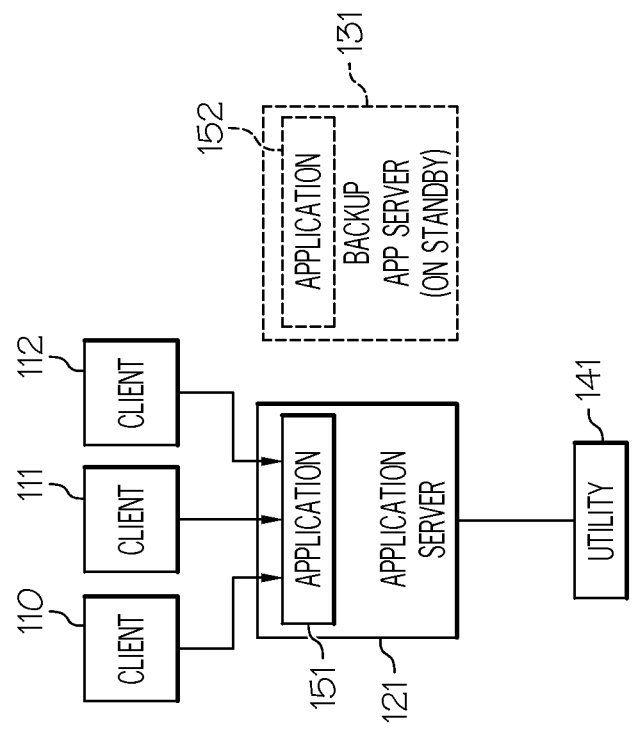

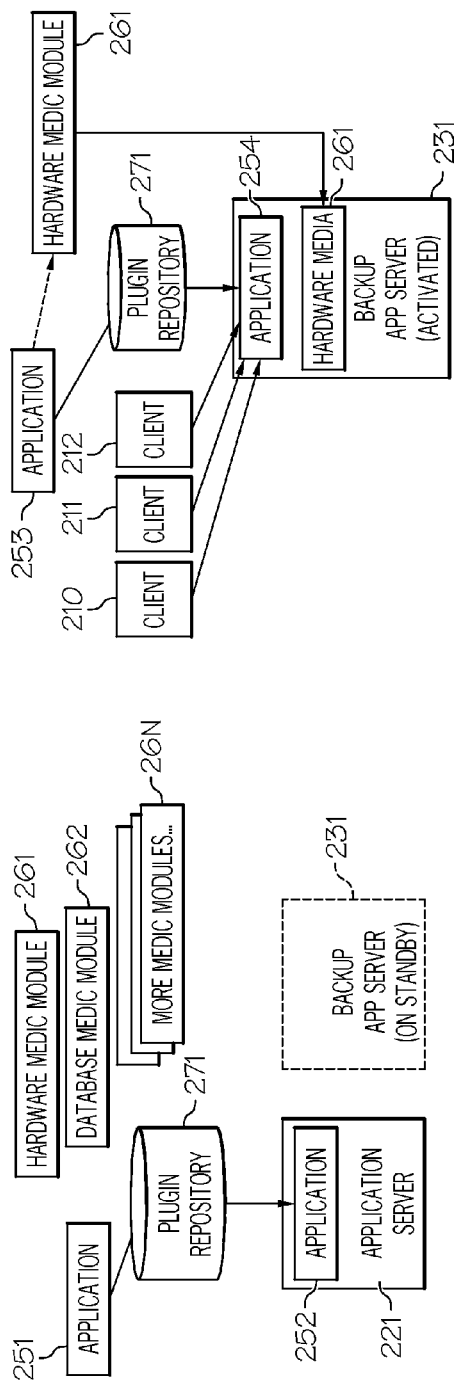
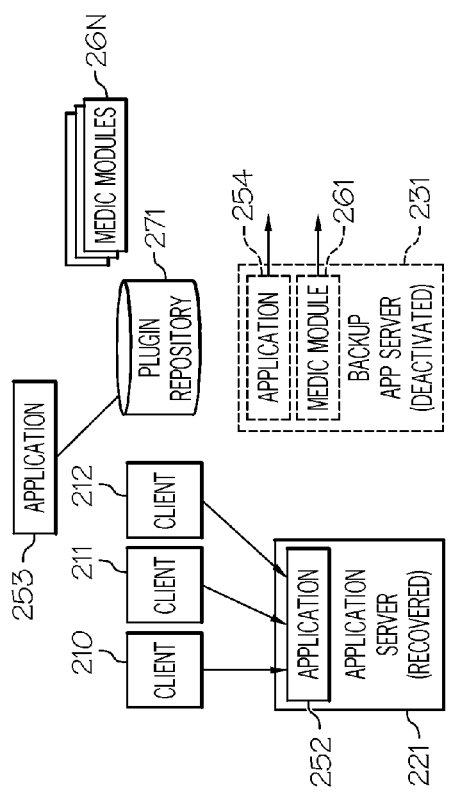
FIG. 2A
FIG. 2B
FIG. 2C

```
<?xml version="1.0" encoding="UTF-8" standalone="yes"?>
<assembly xmlns:urn:schemas-microsoft-com:asm.v1' manifestVersion=1.0">
  <assemblyIdentity
    version="1.0.0.0"
    processorArchitecture="X86"
    name="CompanyName.ProductName"
    type="win32"
  />

<description>Medic module for harddrive diagnosis and repair.</description>

<dependency>
    <dependentMM_hardrive>
      <assemblyIdentity
        type="win32"
        name="IBM.OpenSource.MM.hardrive-diagnosis-repair"
        version="6.0.0.0"
        processorArchitecture="X86"
        publicKeyToken='6595b64144ccf1df'
        language="*"
      />
    </dependentMM_hardrive>
  </dependency>

</assembly>
```

FIG. 5

SELF-HEALING FAILOVER USING A REPOSITORY AND DEPENDENCY MANAGEMENT SYSTEM

BACKGROUND

The invention relates to system diagnosis and repair, and more specifically to automated modules deployable in association with an application, the modules serving to diagnose or repair malfunctioning client-servicing applications.

In the past enterprise applications consisted of a single monolithic binary file. Once a compiler generated the applicable binary file for an application program, the file remained until the next version was recompiled and shipped. Changes in an operating system, hardware, market demands, or other modifications that could affect the enterprise application were dependent on waiting for the next version of the full application to be implemented and recompiled.

More recently, many application programs are comprised of numerous components and many of these components may be linked to the application at runtime, through the use of run-time dependency links. These dependencies may include language support plug-ins, special editor plug-ins, and documentation for how to use a product and other files that are shared by different application programs. These load-time plug-ins and other files may be listed within tables of the application components, which are linked at runtime. When links are used, an operating system may search in a loader search path, application directory, operating system directory or user specified path for the name of the load-time plug-in, or other dependency so that the applicable component code can be loaded into memory for execution. Because load-time plug-ins and other dependencies can be shared by different application programs, the use of load-time or other load-time dependencies can reduce programming time. Examples of programs setting load-time dependencies include: Eclipse update sites; Apache Geronimo; and Apache Maven.

High-availability enterprise applications may provide failover and scalability through the use of a dedicated backup server that is on standby, and has ready-to-run applications previously loaded thereon. If a main application server fails or becomes overloaded, the dedicated backup server may be activated. Activating the backup server may include routing clients to the new backup server and synchronizing the application already loaded on the backup server with the current state of the application database from the primary server. In these enterprise applications, the monitoring activities are performed by utilities that have been installed and configured for the primary server before the failover event occurred. The monitoring utilities in this instance, which are apart from the application, are not customized for the specific event at hand and their operation is not logically connected with the operation of the backup application running on the backup server. WebSphere may be considered an example of an application offering failover systems.

As will be evident to one of skill in the art, the invention described herein is both novel and nonobvious over the plug-ins and enterprise applications that have come before.

BRIEF SUMMARY

Embodiments of the invention may be provided in systems, devices, methods, and articles of manufacture wherein backup functionality and automated system repair are provided. In embodiments, automated deployment of repair or diagnosis modules, sometimes in conjunction with dependency mechanisms for the modules, may be used to service clients diagnose malfunctioning applications and repair malfunctioning applications.

Upon identifying a malfunctioning server or application running on the server, a backup application, along with one or more tailored "medic modules," may be deployed to a functioning server to service clients and to diagnose and repair the malfunctioning server or the malfunctioning application. The deployment mechanism for the application may automatically identify specific medic modules tailored for the problems experienced at the malfunctioning server or the malfunctioning application. In other words, if a hard-disk failure is noted, a medic module tailored for hard-disk diagnosis and repair may be selected and deployed. The deployment mechanism for the backup application, in addition to selecting specific medic modules, may also identify and resolve dependencies declared in the backup application's manifest. These dependencies, for the backup application, may include manifest dependencies that are directed to situation specific medic modules as well as manifest dependencies usually assigned for the backup application in popular or common deployments. These common dependencies can include network ports, communication protocols, I/O management, language support, "portlets," special editors, documentation, etc.

Since the medic module may be deployed in the context of the specific event at hand, the medic module can be customized and selected for the type of problem that occurred (disk full, out of memory, deadlock, network connectivity, etc) or for the runtime environment of the application (hardware platform, operating system, etc). In addition, since the medic module may be deployed within the same runtime framework as the application itself, the medic module may have access to the processor space of the backup application. Through this access the medic module may access diagnostic information from the backup application and configure the application for optimal performance.

After the original malfunction has been repaired or when the main application has come back online, the clients may be transferred back to the original server and the backup application can be undeployed from the backup server, freeing up the backup server. This undeployment may include undeploying the medic module, thereby also reducing the demand or freeing up the linked medic modules' availability, for subsequent use by other applications. When the medic module is deployed as a manifest dependency to the backup server application, the Medic module may automatically undeploy when the application is undeployed.

BRIEF DESCRIPTION OF THE SEVERAL VIEWS OF THE DRAWINGS

FIGS. 1a-1b show schematics of a system that may employ medic modules in accord with embodiments of the invention.

FIGS. 2a-2c show schematics of a plug-in repository, clients, and servers, as may be employed in accord with embodiments of the invention.

FIG. 5 is exemplary code, as may be employed when building manifest dependencies, in accord with embodiments of the invention.

DETAILED DESCRIPTION

Figure 3:
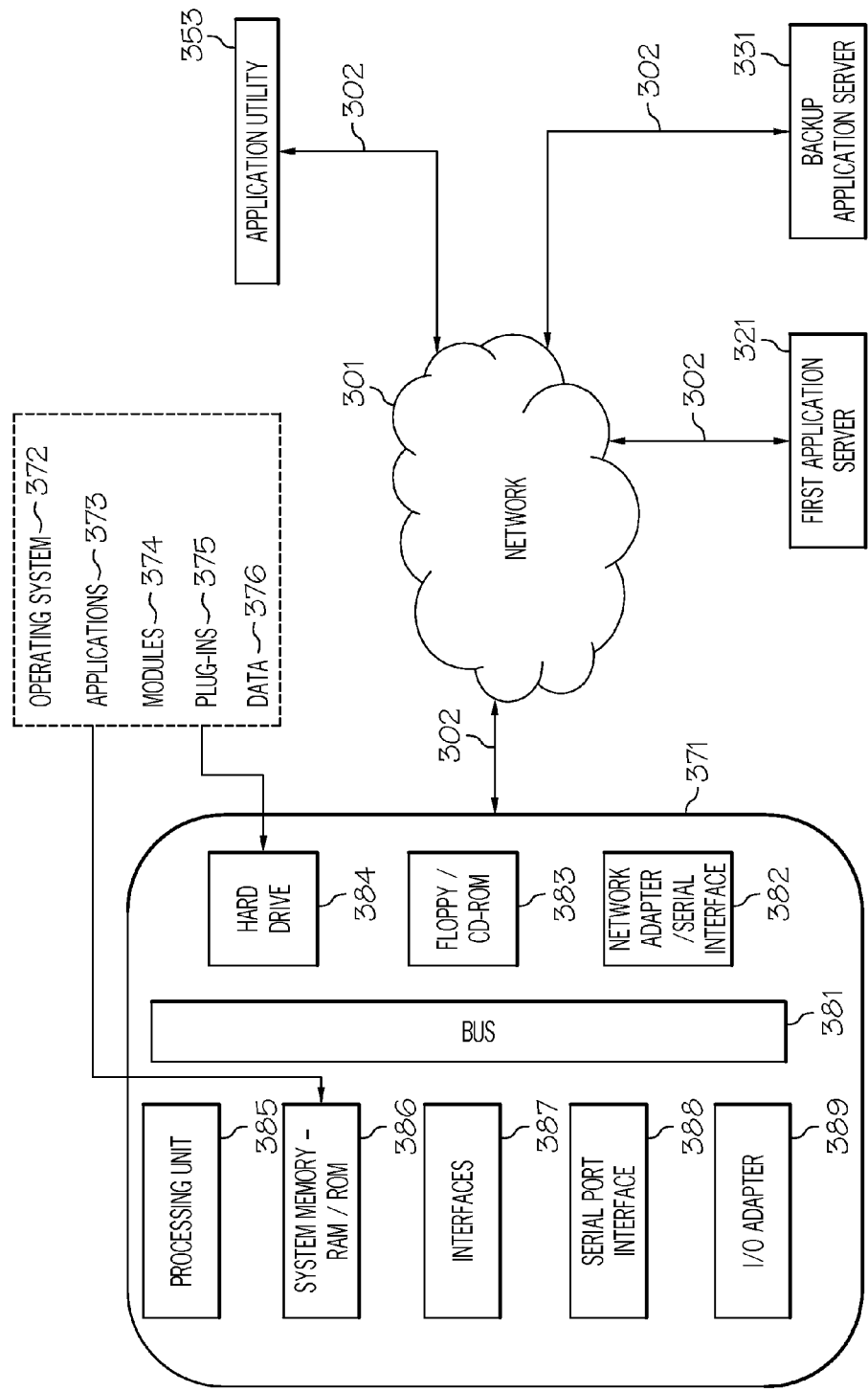
FIG. 3 shows a schematic of a plug-in repository in communication with a network, as may be employed in accord with embodiments of the invention.

FIGS. 1a and 1b shows a system in which embodiments of the invention may be employed. As shown in FIG. 1a, the system may include clients 110, 111, and 112, application server 121, utility 141, applications 151 and 152, and backup application server 131. FIG. 1a shows three clients 110, 111, and 112 being serviced by application server 121, which is running application 151. FIG. 1a also shows the utility 141 monitoring the application server 121. This monitoring may include verification of the status of client requests and the quality of service being provided by the application server 121. The backup server 131 shown may be capable of running application 152 such that the clients may be transferred from application server 121 to application server 131, should any problems arise with the application server 121.

FIG. 1b shows that clients 110, 111, and 112 may be serviced by server 131 should the server 121 malfunction. FIG. 1b also shows that the application 152 may be loaded on the server 131 in order to service clients 110, 111, and 112. In embodiments, as the application 152 is deployed to the server 131, the utility 141 may identify sources of the malfunction of server 121. These identified malfunctions may be used to select medic modules for deployment with the application 152 to the server 131. Thus, as the dependencies for the application 152 are being built, manifest dependencies to select medic modules may be established for the application 152 as it is being deployed and loaded onto server 131. One or more of the selected medic modules may diagnose and repair the application server 121 while the application 152 is running on server 131.

Visible in FIGS. 2a-2c are applications 251 and 254, clients 210, 211, and 212, plug-in repository 271, application server 221, backup server 231, and a plurality of medic modules 261, 262 . . . 26N.

FIGS. 2a, 2b, and 2c demonstrate the progression of how clients may be serviced when a server malfunctions. In FIG. 2a the first application server 221 may be operating and providing an application 252 to clients. If this server 221 were to malfunction, the application 252 may be loaded onto a different server 231 such that the clients may be served by that second server by the reloaded application 254. As the application 254 is being deployed to the second server, dependencies may be built using standard or regular plug-ins as well as medic modules. The medic modules that may be included as dependencies may be selected to specifically diagnose or repair malfunctions in the application server 221. Thus, in accord with embodiments, the plug-in repository 271 may deploy application 254 in conjunction with medic modules 261, 262, . . . 26N, to backup server 231, in order to service clients 210, 211, and 212 as well as to diagnose and repair application server 221.

As shown in FIG. 2c, once the application server 221 has been successfully repaired, the clients may be transferred back to the server 221 and the server 231 may be brought offline. Bringing the server 231 offline may include undeploying the application 254 and the medic module 261. Undeploying a medic module may have the advantage of reducing the workload associated with supporting the medic module.

Further considering FIG. 2b, as the first application server 221 begins to malfunction or is predicted to malfunction by a utility, the backup application 254 may be compiled and deployed to the server 231. As the backup application is deployed, the needed dependencies may be associated through plug-in repository 271. These dependencies may include the main or primary dependencies for the application, which are run for every deployment as well as medic modules, which may be deployed only in specific instances given the malfunctions to be addressed. Like the primary dependencies, when the medic modules are deployed, they may be deployed as a manifest dependency in the application 254.

Once the backup server and medic modules are successful in diagnosing and repairing the primary server, clients 210, 211, and 212, may be transferred back to the first application server 221. This revised client-server state is shown and reflected in FIG. 2c. Examples of the other dependencies that may be deployed or incorporated via dependency at the same time as a medic module may include: additional language support (translated labels and messages for French, German, Russian, etc); additional "portlets" that can be added to the main application's dashboard or welcome page; special editors for formats such as HTML, Javascript, etc.; and documentation for how to use the product.

In FIG. 2b, the dashed line between the application and the hardware medic module indicates that in addition to pulling up the main plug-ins, in the main dependencies, additional dependencies that are not necessarily present on each and every application may also be drawn. In other words, the dashed line shows a case of dependencies being established contingent on the certain applications being deployed and problems encountered at the main or primary server running the main or primary application.

There may be various medic modules employed in accord with embodiments of the invention. These medic modules may include those directed to hardware repair, database repair, indication repair, networking repair, rogue processors, encoding repair, security repair, etc. Depending on the problem perceived at the application server, a limited, select number of medic modules may be deployed as the application is compiled and sent to the backup server—to be run or called by the backup server. In embodiments, prior to or during compilation or deployment, the primary plug-ins and the medic modules may be retained or stored in the plug-in repository 271. The medic modules may be considered a subset of the plug-ins, which may identify shared resources, such as language support, portlets, and network proxies.

FIG. 3 shows a schematic of a plug-in repository 371 as may be employed in embodiments of the invention. The plug-in repository 371 may be connected to a network 301, which may itself be connected to application utility 353, first application server 321, and backup server 331. As can be seen in FIG. 3, the plug-in repository 371 may include processing unit 385, system memory 386, interfaces 387, a serial port interface 388, input-output adapter 389, and hard drive 384. A floppy and CD-ROM drive 383, and a network adapter/serial interface 382 may also be included. All of these components may be connected to each other via a bus 381. The hard drive 384 and the system memory 386 may themselves contain an operating system 372, applications to be run 373, medic modules 374, plug-ins 375, and applicable data 376.

In embodiments, the plug-in repository 371 may receive information from a utility monitoring the first application server 321. This information may include that the first application server 321 is malfunctioning and that the malfunction is considered to be in a certain aspect of the server, e.g., its operating system, its network connector, its hard drive, etc. This information may assist the plug-in repository in selecting the medic modules to be deployed with the application to backup server 331. As shown in FIG. 3, the application utility 353, may be accessed over the network 301. The medic modules may also be accessed over the network in embodiments.

Figure 4:
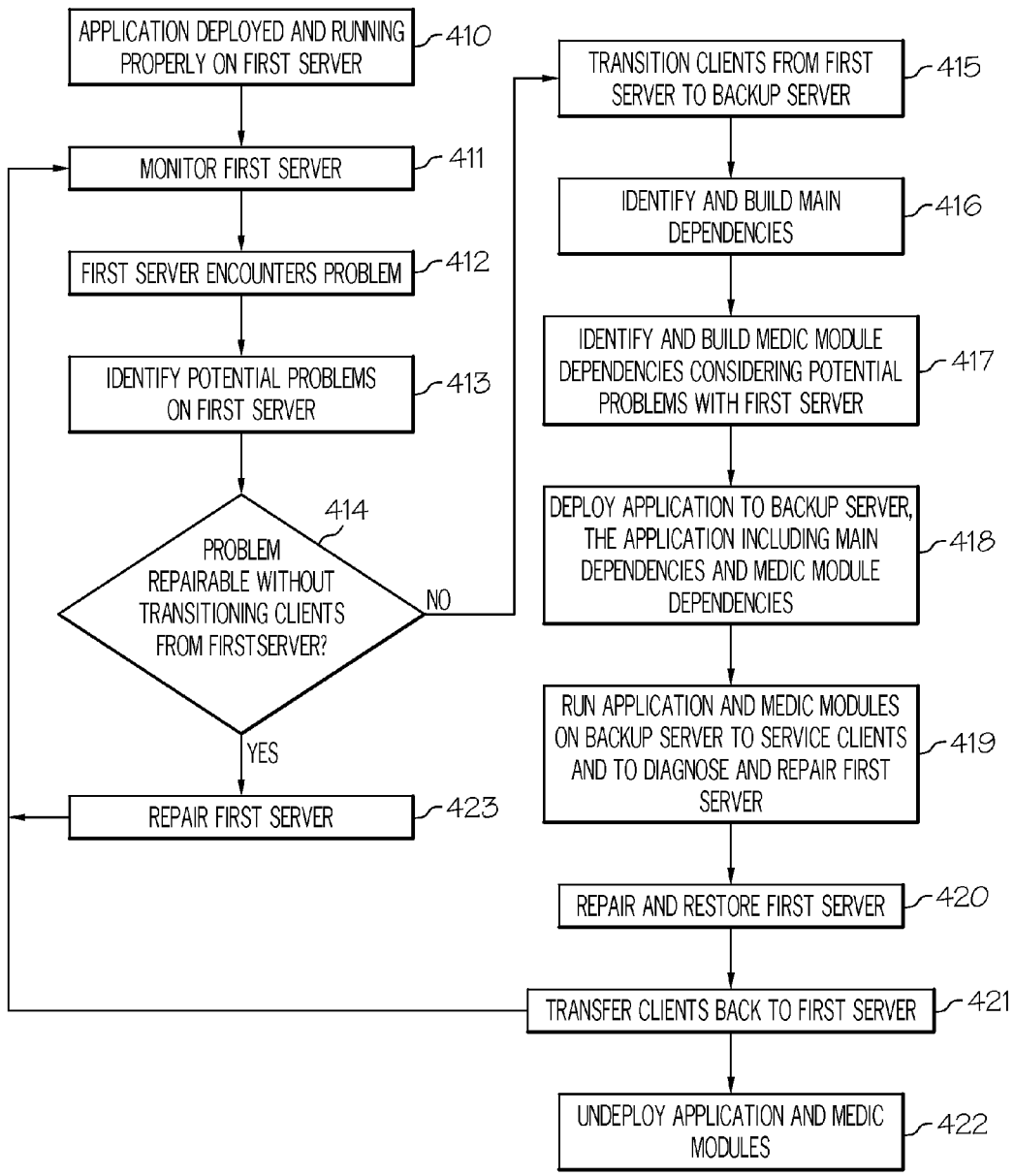
FIG. 4 is a flowchart of a method, as may be employed in accord with embodiments of the invention.

As seen in FIG. 4, various actions of methods practicing embodiments of invention are provided. The various actions provided in FIG. 4 may be conducted in the order described as well as various other orders, and may include more or less actions than those identified in FIG. 4.

As explained in FIG. 4 at 410, an application may be deployed and running properly on a server. This first server may be monitored, as shown at 411. This monitoring may include watching functionality provided by the server, reviewing its level of service, and considering other parameters as well. This monitoring may be conducted by a utility like the one shown in FIG. 1. Should the first server malfunction or encounter a problem, as shown at 412, the malfunction or potential problem may be identified, as shown at 413. Should the problem be repairable without transition of clients from the first server, then the first server will be repaired as shown at 423 and monitoring will continue, as shown at 411.

If the problem necessitates transferring clients to another server, the clients may be transitioned to a backup server, as shown in 415. In addition to having to transition clients from a first server to a backup server, the backup server may need to be brought online. This preparation of the backup server may include building the application and creating main dependencies in so doing. The identification and building of dependencies for the application to be deployed to the backup server is shown at 416. In addition to identifying the main dependencies, medic module dependencies may also be identified and built as the application is transferred to the backup server. This identification and building of the medic module dependencies is shown at 417. At 418, with the application having been built with the customary dependencies and the medic module dependencies, the application may be deployed to the backup server. At 419, the application may be run on the backup server with the medic modules acting to diagnose and repair the problem with the first server or the malfunctioning application itself. This is shown at 419 and 420. Once the repairs are done or at some point time after the medic modules are deployed, clients may be transferred back to the first server as shown at 421 and monitoring may continue as shown at 411. In addition, after clients are transferred back to the first server, the application and the medic modules may be undeployed from the backup server. This undeployment step is shown at 422.

FIG. 5 shows exemplary code as may be employed in accord with embodiment of the invention. The code includes a medic module dependency being set up for diagnosis and repair of a hard drive. The name the dependencies shown in the line entitled "name='IBM. OpenSource.MMharddrive-diagnosis-repair.'"

In embodiments, the dependency management system employed may include IBM program such as SGI AEE and SGI Eclipse. Maven, Apache Geronimo and derivatives of them may also be used when identifying or constructing the dependencies.

In embodiments, appropriate medic modules may include those with diagnosis functions, data gathering functions, or both. Still further, while servers are described above, a peer-to-peer system is also envisioned as well as various PC applications. For example, PC applications can act as the backup in embodiments. Also, in embodiments, the application and the medic modules may be deployed from different locations to the backup server. They may be deployed at different times as well. And, in some embodiments, certain medic modules may be loaded on the backup servers while certain medic modules may be loaded during deployment of the application, after malfunctioning of the primary server.

In embodiments, when in standby mode, the backup application server may be operating in low power setting and may have not yet received the application. The standby mode may change as the backup application is deployed automatically and a set of medic modules is deployed with the application. As noted above, the set of medic modules may be applicable to the specific problem identified in the main or primary server, or at least considered to be specific to the problem identified or existing in the main application server.

In embodiments, the plug-in repository may warehouse components of applications. This could include portions of applications along with main dependencies such as communication and network protocols. Thus, in embodiments, the plug-in repository may function as a service that can provide and assemble the components of an application from its memory and from sources over a network.

In embodiments, prior to, once, or after the primary server is repaired, medic modules may themselves be deployed to the primary server to facilitate monitoring and future repair as well as to finalize ongoing or remaining repair of the server.

In embodiments, and as noted above, hardware medic modules, database medic modules, communication medic modules, protocol medic modules, rogue processor medic modules and memory medic modules, are all examples of medic modules that may be used and deployed in embodiments. The selection, dependency, and use of the medic modules may all be handled automatically by the regular application deployment process. The ability to tailor specific plug-ins, to a problem on the main server, may be included in embodiments of the invention.

Still further, medic modules may themselves contain lists or identities of other medic modules available, as well as pointers to list of links or databases or other systems that can help further facilitate the identification and deployment of subsequent medic modules. As the medic modules are started and running they may have access to the main application server to consider data there and may find corrupt data is causing the problem. The medic modules may have access to other systems as well.

In embodiments, the medic modules can also issue a reboot or restart. In addition, the medic modules might also conduct a data gathering functionality wherein they gather data relevant to the main application, the main application server, the backup application, or the backup application server. This data may include, among other things, whether certain corrupt data is being received at an application server or a certain robot is attacking that server or is addressing the server and proper method. This data gathering may also be used as part of the diagnosis and repair activities conducted by the various medic modules.

In embodiments, a program may be running in the background of the main server wherein the problem in the main server may cause it to crash. This background program may be identified and this identification or other information may be provided and used such that when the backup server is loaded with the application the applicable medic modules to be deployed can be selectively identify and set up. In so doing, overhead burden on the backup server may be optimized or tailored to the problems encountered on the main server.

As used herein a medic module may be considered to be a component for use with or part of an application where the medic module is tailored to diagnose or repair a specific type of problem or application. The medic module may be a stand-alone application as well.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/ or components, but do not preclude the presence or addition of one or more other features, integers, steps, operation, elements, components, and/or groups thereof.

Embodiments may be implemented as a computer process, a computing system or as an article of manufacture, such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A device comprising:
a processor; and
system memory containing instructions to be executed by the processor, the system memory coupled to the processor,
wherein, when running instructions contained in system memory, the processor, upon receiving notification that a first application provided over a network is malfunctioning, specifies and deploys a second application to be provided over the network,
the second application running on a backup server,
the second application being deployed with one or more manifest dependencies to a first medic module, the first medic module serving to at least diagnose or repair the first application,
wherein an identified malfunction of the first application is used to select the first medic module for deployment with the second application, and
wherein the first medic module is specific to the specific malfunction identified.

2. The device of claim 1,
wherein the first medic module is specified prior to setting the dependency by the processor for a category of repair or diagnosis, and
wherein the second application is on standby on the backup server.

3. The device of claim 1 wherein, the first medic module gathers data from a utility previously monitoring the first application, and the first medic module using the data to diagnose or repair the first application.

4. The device of claim 1 wherein the second application is deployed with a manifest dependency to a second medic module and with a manifest dependency to a third medic module, the first medic module, the second medic module, and the third medic module each configured to diagnose and repair separate malfunctions of a first application.

5. The device of claim 1 wherein the medic module is a plug-in, and
wherein the first application is running on a first server and the second application is running on a second server, and
wherein the device stores a plurality of medic modules and nonmedic module plug-ins.

6. The device of claim 1 wherein the second application is also deployed with a manifest dependency to a plug-in.

7. The device of claim 1 wherein the processor considers a malfunction identification from a monitoring utility prior to selecting the first medic module.

8. The device of claim 7 wherein the medic module is selected to diagnose or repair the malfunction identified by the malfunctioning utility.

9. The device of claim 5 wherein
the first application runs on a server accessible over a network, and
the second application runs on a server accessible over a network, and
wherein the medic module is stored in system memory with other plug-ins including one or more of the following plug-ins: language support, portlets, an editor, or documentation for how to use a product.

10. A method comprising:
loading instructions from system memory to a processor, the instructions to be executed by the processor, the system memory coupled to the processor, and
upon receiving notification that a first application provided over a network is malfunctioning, specifying and deploying a second application to be provided over the network,
the second application being deployed with one or more dependencies to a first medic module, the first medic module serving to at least diagnose or repair the first application,
wherein an identified malfunction of the first application is used to select the first medic module for deployment with the second application, and
wherein the second application is on standby on a backup server prior to deployment.

11. The method of claim 10 wherein the first medic module is specified prior to setting the dependency by the processor, for a category of repair or diagnosis,
and wherein the first medic module is applicable to the specific malfunction identified.

12. The method of claim 10 wherein the first medic module gathers data from a utility previously monitoring the first application, and the first medic module using the data to diagnose or repair the first application.

13. The method of claim 10 wherein
the second application is deployed with a manifest dependency to a second medic module and with a manifest dependency to a third medic module,
the first medic module, the second medic module, and the third medic module each configured to diagnose and repair separate malfunctions of a first application.

14. The method of claim 10 wherein the medic module is a plug-in, and
wherein the first application is running on a first server and the second application is running on a second server, and
wherein the device stores a plurality of plug-ins, the plug-ins including medic modules and nonmedic modules.

15. The method of claim 10 wherein the second application is also deployed with a manifest dependency to a plug-in.

16. The method of claim 10 wherein the processor considers a malfunction identification from a monitoring utility prior to selecting the first medic module.

17. The method of claim 6 wherein the medic module is selected to diagnose or repair the malfunction identified by the malfunctioning utility.

18. The method of claim 10 wherein the second application being deployed is deployed with one or more manifest dependencies to the first medic module.

19. The method of claim 14 wherein
the first application runs on a server accessible over a network, and
the second application runs on a server accessible over a network, and
wherein the medic module is stored in system memory with other plug-ins including one or more of the following plug-ins: language support, portlets, an editor, or documentation for how to use a product.

* * * * *